United States Patent
Amick et al.

(10) Patent No.: US 9,814,338 B2
(45) Date of Patent: Nov. 14, 2017

(54) DEBRIS CATCH SYSTEM AND METHOD OF MAKING AND USING THE SAME

(71) Applicant: GM Global Technology Operations LLC, Detroit, MI (US)

(72) Inventors: Douglas J. Amick, Troy, MI (US); Kenton L. West, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 14/618,336

(22) Filed: Feb. 10, 2015

(65) Prior Publication Data

US 2016/0229603 A1    Aug. 11, 2016

(51) Int. Cl.
| | | |
|---|---|---|
| *B65D 1/40* | (2006.01) | |
| *A47G 23/02* | (2006.01) | |
| *B60N 3/10* | (2006.01) | |
| *B60R 7/04* | (2006.01) | |

(52) U.S. Cl.
CPC ......... *A47G 23/0216* (2013.01); *B60N 3/102* (2013.01); *B60R 7/04* (2013.01)

(58) Field of Classification Search
CPC ........ B65D 43/16; B65D 51/24; A47G 23/02; A47G 23/0208; A47G 23/0216; B60N 3/10; B60N 3/102; B60R 7/04
USPC ............... 220/212.5, 740; 224/926; 131/231; 296/152
See application file for complete search history.

(56) References Cited

U.S. PATENT DOCUMENTS

| | | | | |
|---|---|---|---|---|
| 3,308,835 A | * | 3/1967 | Silverberg | ............. A45D 40/22 132/301 |
| 9,302,825 B2 | * | 4/2016 | Liu | ...................... B65D 43/163 |

* cited by examiner

*Primary Examiner* — Jeffrey Allen
(74) *Attorney, Agent, or Firm* — BrooksGroup

(57) ABSTRACT

A number of variations may include a storage assembly having a housing; a storage compartment disposed within the housing having an opening; a cover pivotally coupled to a rotational pivot assembly for substantially covering the opening in a closed position and allowing access to the storage compartment in an open position wherein the cover is capable of actuation between the open position and the closed position through the rotational pivot assembly; and a catcher having a flexible membrane coupled to the cover wherein the catcher is constructed and arranged to eject debris that falls between the cover and the housing.

18 Claims, 5 Drawing Sheets

DEBRIS CATCH SYSTEM AND METHOD OF MAKING AND USING THE SAME

TECHNICAL FIELD

The field to which the disclosure generally relates to includes compartments with movable covers

BACKGROUND

Compartments may be housed in a variety of applications including vehicles and may include a cover.

SUMMARY OF ILLUSTRATIVE VARIATIONS OF THE INVENTION

A number of variations may include a product having a storage assembly comprising: a housing; a storage compartment disposed within the housing having an opening; a cover pivotally coupled to a rotational pivot assembly for substantially covering the opening in a closed position and allowing access to the storage compartment in an open position wherein the cover may be capable of actuation between the open position and the closed position through the rotational pivot assembly; and a catcher comprising a flexible membrane coupled to the cover wherein the catcher may be constructed and arranged to eject debris that falls between the cover and the housing.

A number of variations may include a method including providing a storage assembly comprising: a housing; a storage compartment disposed within the housing having an opening; a cover pivotally coupled to a rotational pivot assembly for substantially covering the opening in a closed position and allowing access to the storage compartment in an open position wherein the cover may be capable of actuation between the open position and the closed position through the rotational pivot assembly; a catcher comprising a flexible membrane coupled to the cover wherein the catcher may be constructed and arranged to eject debris that falls between the cover and the housing, and actuating the cover from the open position to the closed position or vice versa to allow for the catcher to eject debris.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
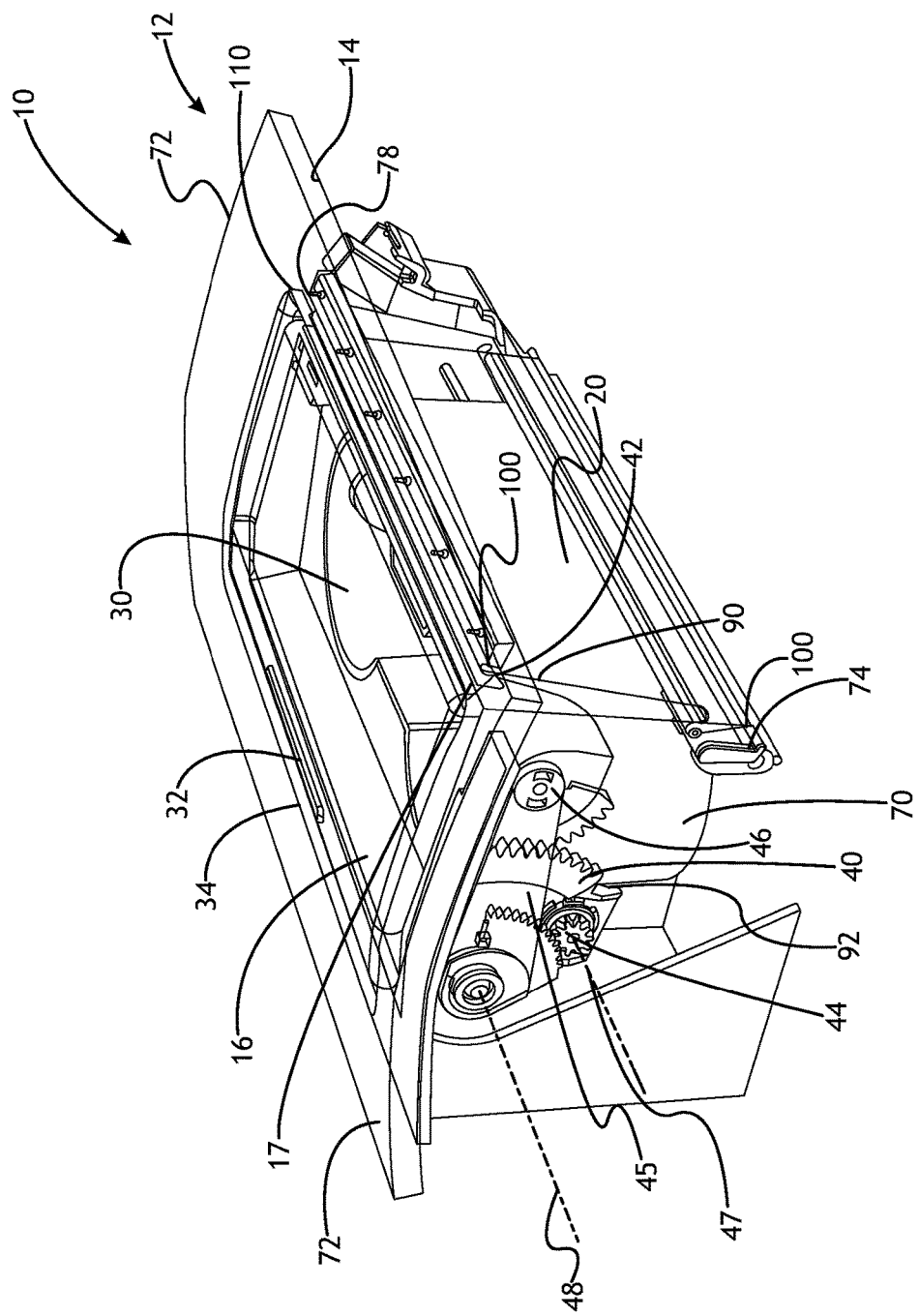
FIG. 1 illustrates a beverage container holder according to a number of variations.
Figure 2:
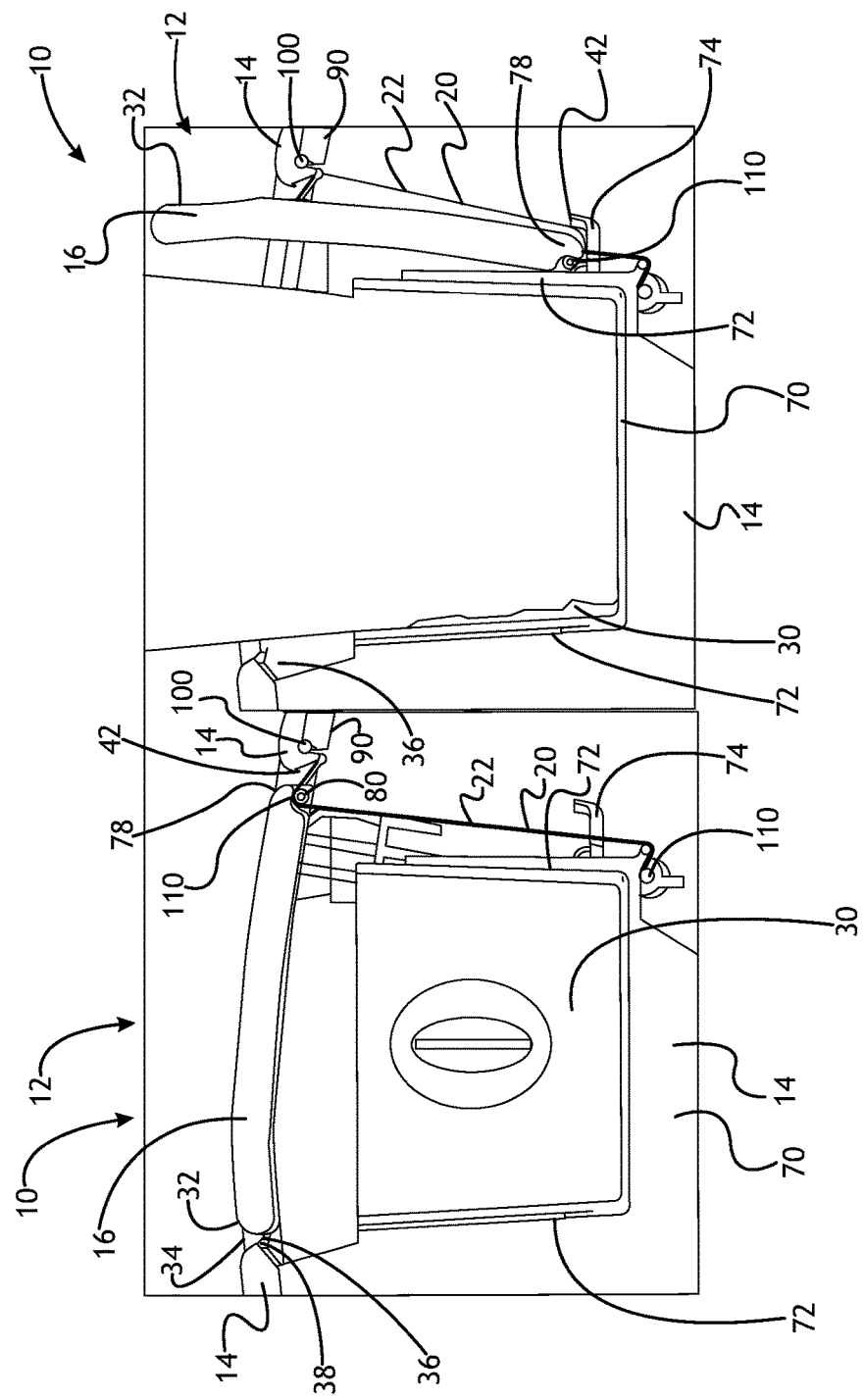
FIG. 2 illustrates a storage assembly according to a number of variations.
Figure 3:
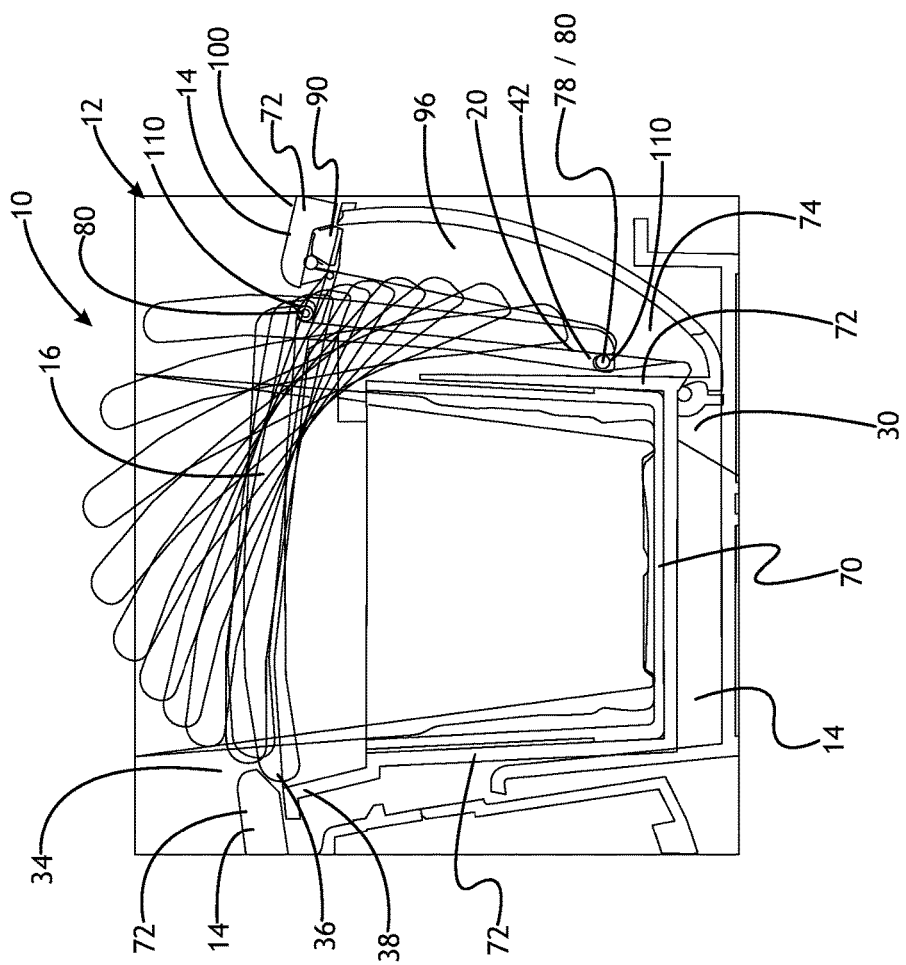
FIG. 3 illustrates a storage assembly according to a number of variations.
Figure 4:
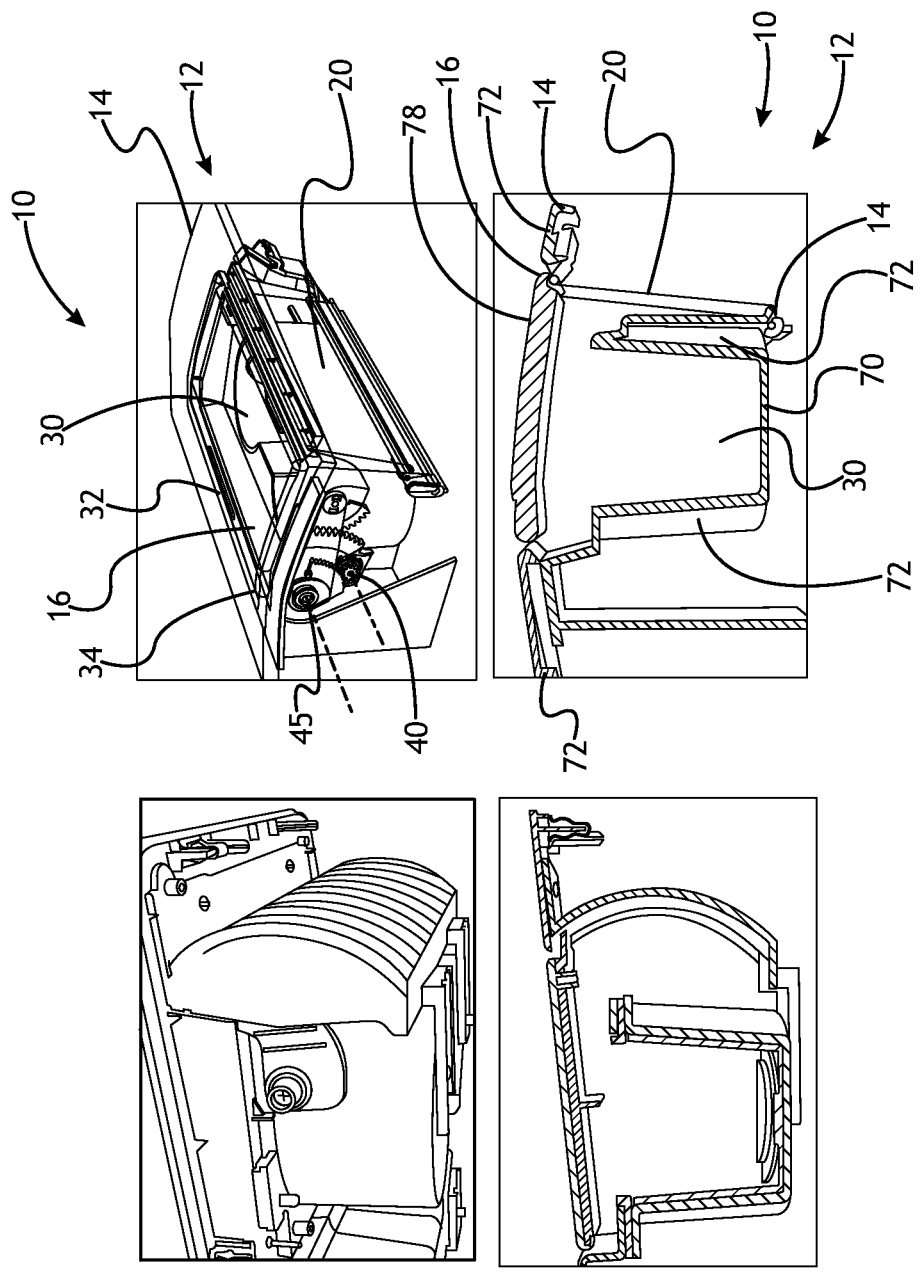
FIG. 4 illustrates a prior art storage assembly and a storage assembly according to a number of variations.

FIG. 1 illustrates a number of variations. In a number of variations, a product 10 is shown. In a number of variations, the product 10 may include a storage assembly 12. In a number of variations, the storage assembly 12 may include a housing 14. In a number of variations, the housing 14 may include an opening to a storage compartment 30. In a number of variations, the storage assembly 12 may include a cover 16. In a number of variations, the storage assembly 12 may include a rotational pivot assembly 18. In a number of variations, the storage assembly 12 may include a catcher 20. As shown in FIG. 2, in a number of variations, the cover 16 may substantially cover the opening of the housing 14 and may be defined as a closed position. In a number of variations, the cover 16 may have a groove or rounded edge 17 between the edge of the housing 14 and the cover 16 to allow for easier actuation. As shown in FIG. 2, in a number of variations, the cover 16 may allow access to the storage compartment 30 through the opening of the housing 14 and may be defined as an open position. In a number of variations, at least one rotational pivot assembly 40 may actuate the cover 16 from an open position to a closed position and vice versa around a movable pivot point 80. In a number of variations, the cover 16 may pivot and rotate around the housing 14 from an open position to a closed position or vice versa as shown in FIG. 3. In a number of variations, the catcher 20 may be coupled to the cover 16. In a number of variations, the catcher 20 may comprise a flexible membrane 22. In a number of variations, the catcher 20 may be coupled to the cover 16 wherein the catcher 20 may be constructed and arranged to ejected debris that falls between the cover 16 and the housing 14. In a number of variations, the groove or rounded edge 17 may allow for debris to collect between the cover 16 and the housing 14 when it is in the open position and ejects the debris during the closing of the cover 16 into the closed position. In a number of variations, the housing 14 may comprise a console in a vehicle. In a number of variations, the catcher 20 may eject debris such as, but not limited to, keys, coins, credit cards, or other sundry items. In a number of variations, the storage compartment 30 may comprise useful features such as, but not limited to, a cup holder, electrical outlet, USB port, media display, indicator lights, plugs, or may be another type. In a number of variations, the cup holder may be standard corporate size. FIG. 4 shows a prior art version of a storage assembly and a storage assembly 12 according to a number of variations. In a number of variations, the storage assembly 12 may be 15-25 mm narrower than the prior art storage assembly.

In a number of variations, the housing 14 may be made of a polymeric material. In a number of variations, the housing 14 may be flexible or rigid. In a number of variations, the housing 14 may be made of a metallic material. In a number of variations, the housing 14 may be made of a fibrous material. In a number of variations, the housing 14 may be made of a ceramic material. In a number of variations, the housing 14 may comprise a material including, but not limited to, plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, combinations thereof, or may be another type. In a number of variations, the housing 14 may comprise a base 70, and a plurality of sides 72. In a number of variations, the exterior of one of the sides 72 may comprise a tab 74 for the cover 16 and/or the catcher 20 to rest in when the cover 16 is in the open position.

In a number of variations, the cover 16 may be made of a polymeric material. In a number of variations, the cover 16 may be flexible or rigid. In a number of variations, the cover 16 may be made of a metallic material. In a number of variations, the cover 16 may be made of a fibrous material. In a number of variations, the cover 16 may be made of a ceramic material. In a number of variations, the cover 16 may comprise a material including, but not limited to, plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, combinations thereof, or may be another type. In a number of variations, the cover 16 may comprise a rod 78 that runs through the cover 16. In a number of variations, the cover 16 may comprise a handle 32. In a number of variations, the handle 32 may attach the cover 16 to the housing 14 when the cover 16 is in the closed position. In a number of variations, engagement of the handle 32 may allow for the cover 16 to move from a closed position to an open position. In a number of variations, a handle assembly 34 may couple the handle 32 on the cover 16 to the housing 14 through a handle receptor 36. In a number of variations, the handle assembly 34, handle 32, and/or handle receptor 36 may comprise an handle attachment 38 including, but not limited to, bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, tie, toggle bolt, zipper, wedge anchor, or may be another type. In a number of variations, the handle assembly 34 may be engaged by pressing on it or otherwise engaging it to move the cover from a closed position to an open position and vice versa.

In a number of variations, the catcher 20 may be made of a polymeric material. In a number of variations, the catcher 20 may be a flexible membrane 22. In a number of variations, the catcher 20 may be flexible or rigid. In a number of variations, the catcher 20 may be made of a metallic material. In a number of variations, the catcher 20 may be made of a fibrous material. In a number of variations, the catcher 20 may be made of a ceramic material. In a number of variations, the catcher 20 may comprise a material including, but not limited to, plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, combinations thereof, or may be another type.

In a number of variations, the rotational pivot assembly 40 may be made of a polymeric material. In a number of variations, the rotational pivot assembly 40 may be made of a metallic material. In a number of variations, the rotational pivot assembly 40 may be made of a fibrous material. In a number of variations, the rotational pivot assembly 40 may be made of a ceramic material. In a number of variations, the rotational pivot assembly 40 may comprise a material including, but not limited to, plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, combinations thereof, or may be another type.

In a number of variations, the rotational pivot assembly 40 may include a gear set 44 including one or more gears to allow smooth movement of the cover 16 around the housing 14 from an open position to a closed position and vice versa. In a number of variations, the rotational pivot assembly 40 may include a spring assembly 90 to allow smooth movement of the cover 16 around the housing 14 from an open position to a closed position and vice versa. In a number of variations, the rotational pivot assembly 40 may include a pulley assembly 92 to allow smooth movement of the cover 16 around the housing 14 from an open position to a closed position and vice versa. In a number of variations, the rotational pivot assembly 40 may include a rail assembly 94 to allow smooth movement of the cover 16 around the housing 14 from an open position to a closed position and vice versa. In a number of variations, the rotational pivot assembly 40 may include a single pivot assembly 96 to allow smooth movement of the cover 16 around the housing 14 from an open position to a closed position and vice versa. In a number of variations, the pivot point 80 of the rotation can move along a path of any line of movement, such as a rectilinear path, a curvilinear path or in the shape of a partial ellipse, circular shape, parabolic shape, or multi-lobe shape or may move in a different path. In a number of variations, rotation of the cover 16 around the pivot point 80 and the location of the pivot point 80 along the desired path may not necessarily be dependent on one another. In a number of variations, the rotational pivot assembly 40 may include a gear set 44. In a number of variations, the rotational pivot assembly 40 may include at least one pivot arm 42. In a number of variations, the pivot arm 42 may be attached to the cover 16 and may couple the rotational pivot assembly 40 to the cover 16 at a pivot point 80. In a number of variations, the pivot arm 42 may attach to or be an extension of the rod 78. In a number of variations, the individual gears of the gear set 44 may include gear teeth spaced along their respective perimeters at a common pitch with adjacent gears with which they may be in operational contact. In a number of variations, each individual gear of a gear set 44 may also have an effective diameter that may not necessarily be the actual diameter of the gear. The individual gears of a gear set 44 may include full or partial gears such as spur gears, helical gears, bevel gears, or any other type. In a number of variations, the gear set 44 may include a shuttle gear system.

In a number of variations, the rotational pivot assembly 40 and/or gear set 44 may occupy a space along the face of the housing 14. In a number of variations, the gear set 44 may include at least one planetary gear 46 and/or at least one sun gear 48. In a number of variations, the locations of the gears within the gear set 44 may be fixed relative to the housing 14. In a number of variations, teeth in each of the gears (planetary, sun) may mesh with each other so that rotation of one gear about its own center causes some other form of gear movement of other gears within the gear set 44. In a number of variations, the sun gear 48 may be fixed so that it may be coupled to the handle assembly 34. In a number of variations, the sun gear 48 may rotate when the handle assembly 34 may be engaged through a spring assembly 90. In a number of variations, the spring assembly 90 may allow for rotation of the sun gear 48. In a number of variations, rotation of the sun gear 48 will in turn cause rotation of a first planetary gear 46. In a number of variations, the first planetary gear 46 may be coupled to the sun gear 48 by a shaft 45. In a number of variations, the shaft 45 may rotate the first planetary gear 46 about the sun gear 48 which may in turn rotate the pivot arm 42 and the cover 16. In a number of variations, the first planetary gear 46 may be attached to the pivot arm 42 so that the pivot arm 42 rotates together with the at least first planetary gear 46 about the center of the planetary gear 461*n* a number of variations, other gears may be formed between the sun gear 48 and the first planetary gear 46, or may coincide or rotate along with them or counter to them. In a number of variations other gears may be coupled to the sun gear 48 and/or first planetary gear 46 and may be engaged, in contact with the other of the first planetary gear 46 or the sun gear 48. In a number of variations, a tertiary gear 47 may aid in rotation of the planetary gear 46 and pivot arm 42 about the sun gear 48 for actuation of the cover 16 in response to the spring assembly 90. In a number of variations, the tertiary gear 47 may be coupled to a set of gear teeth of the shaft 45. In a number of variations, the pivot arm 42 may bend or may be straight or may be any shape to couple the rotational pivot assembly 40 to the cover 16 and/or the catcher. In a number of variations, the gear set 44 may be coupled to the handle assembly 34. In a number of variations, engagement of the handle assembly 34 may allow the gear set 44 to actuate the pivot arm 42 which may actuate the cover 16 and/or the catcher 20. In a number of variations, the spring assembly 90 and/or gear set 44 may move the cover 16 and/or catcher 20 from a closed to an open position coupled with the actuation of the gear set 44. In a number of variations, the spring assembly 90 and/or gear set 44 may move the cover 16 and/or catcher 20 from a closed to an open position coupled with the actuation of the gear set 44 through engagement of the handle assembly 34. In a number of variations, the engagement of the handle assembly 34 may cause the cover 16 and/or catcher 20 to move from a closed position to an open position through the rotational pivot assembly 40. In a number of variations, the engagement of the handle assembly 34 may cause the cover 16 and/or catcher 20 to move from an open position to a closed position through the rotational pivot assembly 40.

In a number of variations, the catcher 20 may be attached to the housing 14 through at least one housing attachment point 100. In a number of variations, the housing attachment point 100 may comprise an edge, knob, or other projection along a face of the housing 14. In a number of variations, the catcher 20 may be attached to the cover 16 through the at least one cover attachment point 110. In a number of variations, the cover attachment point 110 may comprise an edge, knob, or other projection along a face of the cover 16. In a number of variations, the cover attachment point 110 may be a protrusion of the rod 78 through a face of the cover 16. In a number of variations, the catcher 20 may slide over the cover attachment point 110 during movement of the cover from a closed position to an open position and vice versa. In a number of variations, the cover attachment point 110 may act as a rolling towel bar for the catcher 20 to slide over the cover attachment point 110 during movement of the cover from a closed position to an open position and vice versa. In a number of variations, the cover attachment point 110 may act as a bearing for the catcher 20 to rotate the bearing cover attachment point 110 during movement of the cover from a closed position to an open position and vice versa. FIG. 2 shows the catcher 20 in the closed and open positions where the catcher 20 may be attached to the cover 16 through a cover attachment point 110. In a number of variations, the catcher 20 may be stretched when the cover 16 may be moved from the closed position to the open position and may hold debris that has fallen between the catcher 20 and the housing 14; the cover 16 and the housing 14; and/or the cover 16 and the catcher 20 or a combination thereof. In a number of variations, the catcher 20 may slide through the cover attachment point 110 during actuation of the cover 16. In a number of variations, when the cover 16 may be moved back to a closed position from an open position, the catcher 20 may eject debris lost between the catcher 20 and the housing 14; the cover 16 and the housing 14; and/or the cover 16 and the catcher 20 or a combination thereof.

Figure 5:
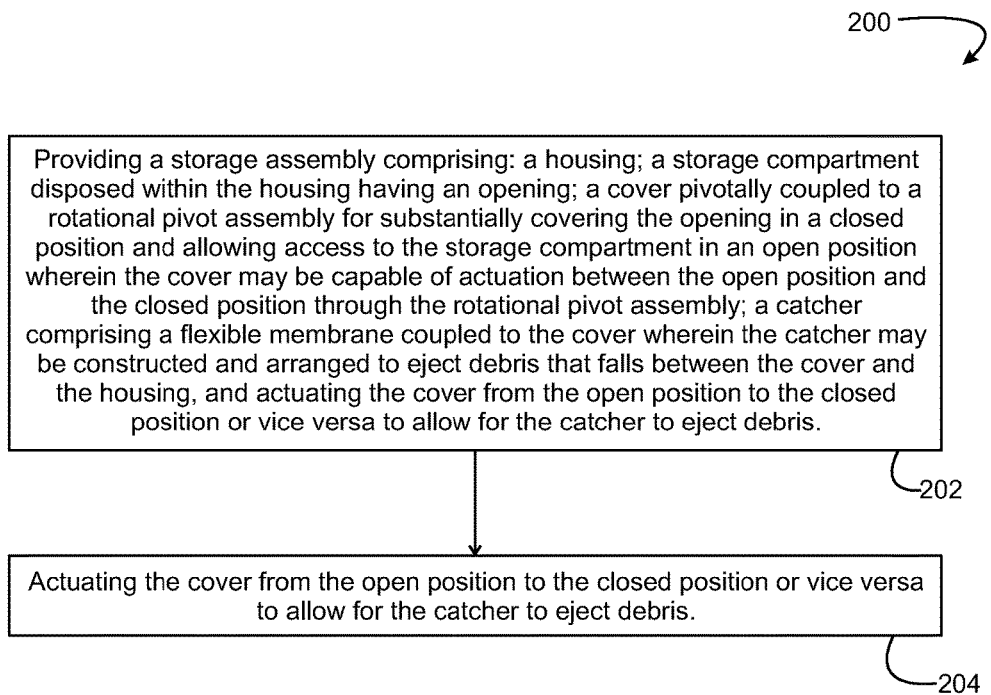
FIG. 5 illustrates a method according to a number of variations.

As shown in FIG. 5, in a number of variations, a method 200 may be shown wherein the method includes step 202 of providing a storage assembly comprising: a housing; a storage compartment disposed within the housing having an opening; a cover pivotally coupled to a rotational pivot assembly for substantially covering the opening in a closed position and allowing access to the storage compartment in an open position wherein the cover may be capable of actuation between the open position and the closed position through the rotational pivot assembly; a catcher comprising a flexible membrane coupled to the cover wherein the catcher may be constructed and arranged to eject debris that falls between the cover and the housing, and actuating the cover from the open position to the closed position or vice versa to allow for the catcher to eject debris. In a number of variations, the method 200 further includes step 204 of actuating the cover from the open position to the closed position or vice versa to allow for the catcher to eject debris. In a number of variations, the method 200 further includes wherein the cover comprises a handle and wherein the housing comprises a handle receptor to form a handle assembly.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include product comprising a storage assembly comprising: a housing; a storage compartment disposed within the housing having an opening; a cover pivotally coupled to a rotational pivot assembly for substantially covering the opening in a closed position and allowing access to the storage compartment in an open position wherein the cover is capable of actuation between the open position and the closed position through the rotational pivot assembly; and a catcher comprising a flexible membrane coupled to the cover wherein the catcher is constructed and arranged to eject debris that falls between the cover and the housing.

Variation 2 may include a product as set forth in Variation 1 wherein the storage compartment comprises a cup holder.

Variation 3 may include a product as set forth in any of Variations 1-2 wherein the rotational pivot assembly comprises a gear set.

Variation 4 may include a product as set forth in any of Variations 1-3 wherein the rotational pivot assembly comprises a spring assembly.

Variation 5 may include a product as set forth in any of Variations 1-4 wherein the catcher is attached to the housing at a plurality of housing attachment points.

Variation 6 may include a product as set forth in any of Variations 1-5 wherein cover comprises at least one exterior cover attachment point where the catcher slides through the cover attachment point during actuation of the cover.

Variation 7 may include a product as set forth in any of Variations 1-6 wherein the catcher comprises a polymeric material.

Variation 8 may include a product as set forth in Variations 1-7 wherein the housing is made of a rigid polymeric material.

Variation 9 may include a product as set forth in any of Variations 1-8 wherein the cover is made of a rigid polymeric material.

Variation 10 may include a product as set forth in any of Variations 1-9 wherein the cover comprises a handle and wherein the housing comprises a handle receptor to form a handle assembly and wherein engagement of the handle assembly causes the cover to move from a closed position to an open position through the rotational pivot assembly.

Variation 11 may include a method including providing a storage assembly comprising: a housing; a storage compartment disposed within the housing having an opening; a cover pivotally coupled to a rotational pivot assembly for substantially covering the opening in a closed position and allowing access to the storage compartment in an open position wherein the cover is capable of actuation between the open position and the closed position through the rotational pivot assembly; a catcher comprising a flexible membrane coupled to the cover wherein the catcher is constructed and arranged to eject debris that falls between the cover and the housing, and actuating the cover from the open position to the closed position or vice versa to allow for the catcher to eject debris.

Variation 12 may include a method as set forth in Variation 11 wherein the storage compartment comprises a cup holder.

Variation 13 may include a method as set forth in any of Variations 11-12 wherein the rotational pivot assembly comprises a gear set.

Variation 14 may include a method as set forth in any of Variations 11-13 wherein the rotational pivot assembly comprises a spring assembly.

Variation 15 may include a method as set forth in any of Variations 11-14 wherein the catcher is attached to the housing at a plurality of housing attachment points.

Variation 16 may include a method as set forth in any of Variations 11-15 wherein cover comprises at least one exterior cover attachment point where the catcher slides through the cover attachment point during actuation of the cover.

Variation 17 may include a method as set forth in any of Variations 11-16 wherein the catcher comprises a polymeric material Variation 18 may include a method as set forth in any of Variations 11-17 wherein the housing is made of a rigid polymeric material.

Variation 19 may include a method as set forth in any of Variations 17-18 wherein the cover is made of a rigid polymeric material.

Variation 20 may include a method as set forth in any of Variations 17-19 wherein the cover comprises a handle and wherein the housing comprises a handle receptor to form a handle assembly and wherein the method further comprises engaging the handle assembly to cause the cover to move from a closed position to an open position through the rotational pivot assembly.

Variation 21 may include a method, and/or a product as set forth in any of Variations 1-20 wherein the housing is be flexible or rigid.

Variation 22 may include a method, and/or a product as set forth in any of Variations 1-21 wherein the cover is be flexible or rigid.

Variation 23 may include a method, and/or a product as set forth in any of Variations 1-22 wherein the catcher is be flexible or rigid.

Variation 24 may include a method, and/or a product as set forth in any of Variations 1-23 wherein the rotational pivot assembly actuates the cover from an open position to a closed position and vice versa around a movable pivot point.

Variation 25 may include a method, and/or a product as set forth in any of Variations 1-24 wherein the catcher may comprise a flexible membrane.

Variation 26 may include a method, and/or a product as set forth in any of Variations 1-25 wherein the catcher may be coupled to the cover.

Variation 26 may include a method, and/or a product as set forth in any of Variations 1-25 wherein the housing may comprise a console in a vehicle.

Variation 27 may include a method, and/or a product as set forth in any of Variations 1-26 wherein the storage compartment may comprise a cup holder, electrical outlet, USB port, media display, indicator lights, or plugs.

Variation 28 may include a method, and/or a product as set forth in any of Variations 1-27 wherein the debris may include keys, coins, credit cards, or other sundry items.

Variation 29 may include a method, and/or a product as set forth in any of Variations 1-28 wherein the housing may be made of a polymeric material.

Variation 30 may include a method, and/or a product as set forth in any of Variations 1-29 wherein the housing may be made of a fibrous material.

Variation 31 may include a method, and/or a product as set forth in any of Variations 1-30 wherein the housing may be made of a metallic material.

Variation 32 may include a method, and/or a product as set forth in any of Variations 1-31 wherein the housing may be made of a ceramic material.

Variation 33 may include a method, and/or a product as set forth in any of Variations 1-32 wherein the housing may comprise plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, or combinations thereof.

Variation 34 may include a method, and/or a product as set forth in any of Variations 1-33 wherein the cover may be made of a polymeric material.

Variation 35 may include a method, and/or a product as set forth in any of Variations 1-34 wherein the cover may be made of a fibrous material.

Variation 36 may include a method, and/or a product as set forth in any of Variations 1-35 wherein the cover may be made of a metallic material.

Variation 37 may include a method, and/or a product as set forth in any of Variations 1-36 wherein the cover may be made of a ceramic material.

Variation 38 may include a method, and/or a product as set forth in any of Variations 1-37 wherein the cover may comprise plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, or combinations thereof.

Variation 39 may include a method, and/or a product as set forth in any of Variations 1-38 wherein the catcher may be made of a polymeric material.

Variation 40 may include a method, and/or a product as set forth in any of Variations 1-39 wherein the catcher may be made of a fibrous material.

Variation 41 may include a method, and/or a product as set forth in any of Variations 1-40 wherein the catcher may be made of a metallic material.

Variation 42 may include a method, and/or a product as set forth in any of Variations 1-41 wherein the catcher may be made of a ceramic material.

Variation 43 may include a method, and/or a product as set forth in any of Variations 1-42 wherein the catcher may comprise plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, or combinations thereof.

Variation 44 may include a method, and/or a product as set forth in any of Variations 1-43 wherein the rotational pivot assembly may be made of a polymeric material.

Variation 45 may include a method, and/or a product as set forth in any of Variations 1-44 wherein the rotational pivot assembly may be made of a fibrous material.

Variation 46 may include a method, and/or a product as set forth in any of Variations 1-45 wherein the rotational pivot assembly may be made of a metallic material.

Variation 47 may include a method, and/or a product as set forth in any of Variations 1-46 wherein the rotational pivot assembly may be made of a ceramic material.

Variation 48 may include a method, and/or a product as set forth in any of Variations 1-47 wherein the rotational pivot assembly may comprise plastic steel, stainless steel, copper, nickel, tin, noble metals, zinc, iron, bronze, aluminum, titanium, platinum, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polybenzimidazoles, polyacrylonitrile, PVB, silicone, bioplastic, Teflon, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), metallic alloys, or combinations thereof.

Variation 49 may include a method, and/or a product as set forth in any of Variations 1-48 wherein the housing includes a base and a plurality of sides.

Variation 50 may include a method, and/or a product as set forth in any of Variations 1-49 wherein the exterior of one of the sides may comprise a tab for the cover and/or the catcher to rest in when the cover is in the open position.

Variation 51 may include a method, and/or a product as set forth in any of Variations 1-50 wherein cover comprises a rod that runs through the cover.

Variation 52 may include a method, and/or a product as set forth in any of Variations 1-51 wherein cover comprises a handle.

Variation 53 may include a method, and/or a product as set forth in any of Variations 1-52 wherein the handle attaches the cover to the housing when the cover is in a closed position.

Variation 54 may include a method, and/or a product as set forth in any of Variations 1-53 wherein engagement of the handle may allow for the cover to move from a closed position to an open position.

Variation 55 may include a method, and/or a product as set forth in any of Variations 1-54 wherein the housing includes a handle receptor.

Variation 56 may include a method, and/or a product as set forth in any of Variations 1-55 wherein the handle assembly, handle, and/or handle receptor may include a handle attachment including a bolt, fastener, buckle, button, cable tie, clamp, clip, clutch, flange, frog, grommet, latch, nail, peg, pin, hook and loop fastener, rivet, screw anchor, snap fastener, staple, stitch, strap, threaded fastener, tie, toggle bolt, zipper, wedge anchor, or combination thereof.

Variation 57 may include a method, and/or a product as set forth in any of Variations 1-56 wherein handle assembly may be engaged by pressing on it or otherwise engaging it to move the cover.

Variation 58 may include a method, and/or a product as set forth in any of Variations 1-57 wherein the frame comprises the rear interior of a vehicle trim.

Variation 59 may include a method, as set forth in any of Variations 1-58 wherein the pivot point may move along a path of movement such as a rectilinear path, a curvilinear path or in the shape of a partial ellipse, circular shape, parabolic shape, or multi-lobe shape.

Variation 60 may include a method, and/or a product as set forth in any of Variations 1-59 wherein the rotational pivot assembly includes a pivot arm.

Variation 61 may include a method, and/or a product as set forth in any of Variations 1-60 wherein the pivot arm is attached to the cover and may couple the rotational pivot assembly to the cover at a pivot point.

Variation 61 may include a method, and/or a product as set forth in any of Variations 1-60 wherein pivot arm is an extension of the rod.

Variation 62 may include a method, and/or a product as set forth in any of Variations 1-61 wherein gear set includes a plurality of gears that may include gear teeth in operational contact with one another.

Variation 63 may include a method, and/or a product as set forth in any of Variations 1-62 wherein the gears may include full or partial gears such as spur gears, helical gears, bevel gears, or may include a shuttle gear system.

Variation 64 may include a method, and/or a product as set forth in any of Variations 1-63 wherein rotational pivot assembly and/or gear set occupies a space along the face of the housing.

Variation 65 may include a method, and/or a product as set forth in any of Variations 1-64 wherein the gear set includes at least one planetary gear and/or at least one sun gear.

Variation 66 may include a method, and/or a product as set forth in any of Variations 1-65 wherein the gears are fixed relative to the housing.

Variation 67 may include a method, and/or a product as set forth in any of Variations 1-66 wherein teeth of the gears mesh with each other so rotation of one gear around its own center causes some other form of gear movement within the gear set.

Variation 68 may include a method, and/or a product as set forth in any of Variations 1-67 wherein the sun gear is fixed so it is coupled to the handle assembly.

Variation 69 may include a method, as set forth in any of Variations 1-68 wherein the sun gear rotates when the handle assembly is engaged through a spring assembly.

Variation 70 may include a method, and/or a product as set forth in any of Variations 1-69 wherein the spring assembly allows for rotation of the sun gear.

Variation 71 may include a method, and/or a product as set forth in any of Variations 1-70 wherein the rotation of the sun gear causes rotation of the first planetary gear.

Variation 72 may include a method, and/or a product as set forth in any of Variations 1-71 wherein the first planetary gear may be attached to the pivot arm so that it rotates together with the first planetary gear about the center of the planetary gear.

Variation 73 may include a method, and/or a product as set forth in any of Variations 1-72 wherein other gears are formed, engaged, or in contact with the first planetary gear and/or the sun gear between the first planetary gear and the sun gear.

Variation 74 may include a method, and/or a product as set forth in any of Variations 1-73 wherein the pivot arm may bend or may be straight or may be any shape to couple the rotational pivot assembly to the cover and/or the catcher.

Variation 75 may include a method, and/or a product as set forth in any of Variations 1-74 wherein the gear set may be coupled to the handle assembly.

Variation 76 may include a method, and/or a product as set forth in any of Variations 1-75 wherein the handle assembly may allow the gear set to actuate the pivot arm which may actuate the cover and/or the catcher.

Variation 77 may include a method, and/or a product as set forth in any of Variations 1-76 wherein the spring assembly may move the cover and/or catcher from a closed position to an open position coupled with the actuation of the gear set through engagement of the handle assembly.

Variation 78 may include a method, and/or a product as set forth in any of Variations 1-77 wherein the spring assembly may move the cover and/or catcher from an open position to a closed position coupled with the actuation of the gear set through engagement of the handle assembly.

Variation 79 may include a method, as set forth in any of Variations 1-78 wherein engagement of the handle assembly may cause the cover and/or catcher to move from a closed position to an open position through the rotational assembly.

Variation 80 may include a method, as set forth in any of Variations 1-79 wherein engagement of the handle assembly may cause the cover and/or catcher to move from an open position to a closed position through the rotational assembly.

Variation 81 may include a method, and/or a product as set forth in any of Variations 1-80 wherein catcher is attached to the housing through a housing attachment point.

Variation 82 may include a method, and/or a product as set forth in any of Variations 1-81 wherein the housing attachment point comprises an edge, knob or other projection along a face of the housing.

Variation 83 may include a method, and/or a product as set forth in any of Variations 1-82 wherein catcher is attached to the cover through a cover attachment point.

Variation 84 may include a method, and/or a product as set forth in any of Variations 1-84 wherein the cover attachment point comprises an edge, knob or other projection along a face of the cover.

Variation 85 may include a method, and/or a product as set forth in any of Variations 1-84 wherein cover attachment point may be a protrusion of the rod through a face of the cover.

Variation 86 may include a method, and/or a product as set forth in any of Variations 1-85 wherein the catcher may slide over the cover attachment point during movement of the cover from a closed position to an open position and vice versa.

Variation 87 may include a method, and/or a product as set forth in any of Variations 1-86 wherein the catcher may be stretched through the cover attachment point during actuation of the cover.

Variation 88 may include a method, and/or a product as set forth in any of Variations 1-87 wherein the cover comprises a groove or rounded edge between the edge of the housing and the cover that allows for debris to collect between the cover and the housing in the open position and ejects the debris during the closing of the cover into the closed position.

Variation 89 may include a method, and/or a product as set forth in any of Variations 1-88 wherein the rotational pivot assembly comprises a pulley assembly to allow smooth movement of the cover around the housing from an open position to a closed position and vice versa.

Variation 90 may include a method, and/or a product as set forth in any of Variations 1-89 wherein the rotational pivot assembly comprises a rail assembly to allow smooth movement of the cover around the housing from an open position to a closed position and vice versa.

Variation 91 may include a method, and/or a product as set forth in any of Variations 1-90 wherein the rotational pivot assembly comprises a single pivot assembly to allow smooth movement of the cover around the housing from an open position to a closed position and vice versa.

Variation 92 may include a method, and/or a product as set forth in any of Variations 1-91 wherein the first planetary gear is coupled to the sun gear by a shaft which rotates the first planetary gear about the sun gear which in turn rotates the pivot arm and the cover.

Variation 93 may include a method, and/or a product as set forth in any of Variations 1-92 wherein the gear set further includes a tertiary gear which aids in rotation of the planetary gear and pivot arm about the sun gear for actuation of the cover in response to the spring assembly.

Variation 94 may include a method, and/or a product as set forth in any of Variations 1-93 wherein the cover attachment point acts as a rolling towel bar for the catcher to slide over the cover attachment point during movement of the cover from a closed position to an open position and vice versa.

Variation 95 may include a method, and/or a product as set forth in any of Variations 1-94 wherein the cover attachment point 110 acts as a bearing for the catcher to rotate the bearing during movement of the cover from a closed position to an open position and vice versa.

The above description of select examples of the invention is merely exemplary in nature and, thus, variations or variants thereof are not to be regarded as a departure from the spirit and scope of the invention.

What is claimed is:

1. A product comprising a storage assembly comprising:
   a housing;
   a storage compartment disposed within the housing having an opening;
   a cover pivotally coupled to a rotational pivot assembly for substantially covering the opening in a closed position and allowing access to the storage compartment in an open position wherein the cover is capable of actuation between the open position and the closed position through the rotational pivot assembly and wherein the cover comprises at least one cover attachment point comprising a rod; and
   a catcher comprising a flexible membrane coupled to the cover wherein the catcher is constructed and arranged to eject debris that falls between the cover and the housing wherein actuation of the cover from the open position to the closed position through the rotational pivot assembly causes the catcher to be drawn through the at least one cover attachment point and over the rod such that debris is kept between the cover and the catcher during actuation, thereby ejecting debris from between the cover and the housing.

2. A product as set forth in claim 1 wherein the storage compartment comprises a cup holder.

3. A product as set forth in claim 1 wherein the rotational pivot assembly comprises a gear set.

4. A product as set forth in claim 1 wherein the rotational pivot assembly comprises a spring assembly.

5. A product as set forth in claim 1 wherein the catcher is attached to the housing at a plurality of housing attachment points.

6. A product as set forth in claim 1 wherein the catcher comprises a polymeric material.

7. A product as set forth in claim 1 wherein the housing is made of a rigid polymeric material.

8. A product as set forth in claim 1 wherein the cover is made of a rigid polymeric material.

9. A product as set forth in claim 1 wherein the cover comprises a handle and wherein the housing comprises a handle receptor to form a handle assembly and wherein engagement of the handle assembly causes the cover to move from a closed position to an open position through the rotational pivot assembly.

10. A method comprising
    providing a storage assembly comprising: a housing; a storage compartment disposed within the housing having an opening; a cover pivotally coupled to a rotational pivot assembly for substantially covering the opening in a closed position and allowing access to the storage compartment in an open position wherein the cover is capable of actuation between the open position and the closed position through the rotational pivot assembly;
    providing a catcher comprising a flexible membrane coupled to the cover at an at least one cover attachment point wherein the catcher is constructed and arranged to eject debris that falls between the cover and the housing, and
    actuating the cover from the open position to the closed position or vice versa to allow for the catcher to eject debris wherein actuation of the cover through the rotational pivot assembly causes the catcher to be drawn through the at least one cover attachment point such that debris is kept between the cover and the catcher during actuation, thereby ejecting debris from between the cover and the housing.

11. A method as set forth in claim 10 wherein the storage compartment comprises a cup holder.

12. A method as set forth in claim 10 wherein the rotational pivot assembly comprises a gear set.

13. A method as set forth in claim 10 wherein the rotational pivot assembly comprises a spring assembly.

14. A method as set forth in claim 10 wherein the catcher is attached to the housing at a plurality of housing attachment points.

15. A method as set forth in claim 10 wherein the catcher comprises a polymeric material.

16. A method as set forth in claim 10 wherein the housing is made of a rigid polymeric material.

17. A method as set forth in claim 10 wherein the cover is made of a rigid polymeric material.

18. A method as set forth in claim 10 wherein the cover comprises a handle and wherein the housing comprises a handle receptor to form a handle assembly and wherein the method further comprises engaging the handle assembly to cause the cover to move from a closed position to an open position through the rotational pivot assembly.

* * * * *